United States Patent

Rose

[15] 3,643,817
[45] Feb. 22, 1972

[54] COMBINATION STACKER-FEEDER

[72] Inventor: Boyd W. Rose, Riverside, Calif.

[73] Assignee: FMC Corporation, San Jose, Calif.

[22] Filed: Sept. 16, 1970

[21] Appl. No.: 72,706

[52] U.S. Cl. ........................... 214/6 BA, 198/24, 271/DIG. 4
[51] Int. Cl. .......................................................... B65g 57/30
[58] Field of Search .................... 214/6 BA, 7, 6; 271/DIG. 4, 271/87; 198/24

[56] References Cited

UNITED STATES PATENTS

| 3,387,720 | 6/1968 | Wilkin | 214/6 BA |
| 3,517,482 | 6/1970 | Beninger | 214/6 BA |

FOREIGN PATENTS OR APPLICATIONS

| 835,565 | 5/1960 | Great Britain | 214/6 BA |

Primary Examiner—Gerald M. Forlenza
Assistant Examiner—Robert J. Spar
Attorney—F. W. Anderson, C. E. Tripp and R. S. Kelly

[57] ABSTRACT

A combination stacker-feeder for filler flats which includes a member for lifting the flats individually from a primary conveyor onto a pair of opposed supports which are cammed outwardly by the upwardly moving flat. When it is desired to feed the flats individually from the supports, an endless chain conveyor having spaced pusher lugs thereon is positioned between the supports with its lower run in the plane of the supports. The endless conveyor is intermittently energized by the lifting of each flat so that the flat will be engaged by one of the lugs to be slid off the supports and moved laterally of the primary conveyor. When it is desired to stack the flats upon the supports, the endless chain conveyor is arranged for pivotal movement about one end thereof so that it can be rotated completely out of the stacking area.

13 Claims, 5 Drawing Figures

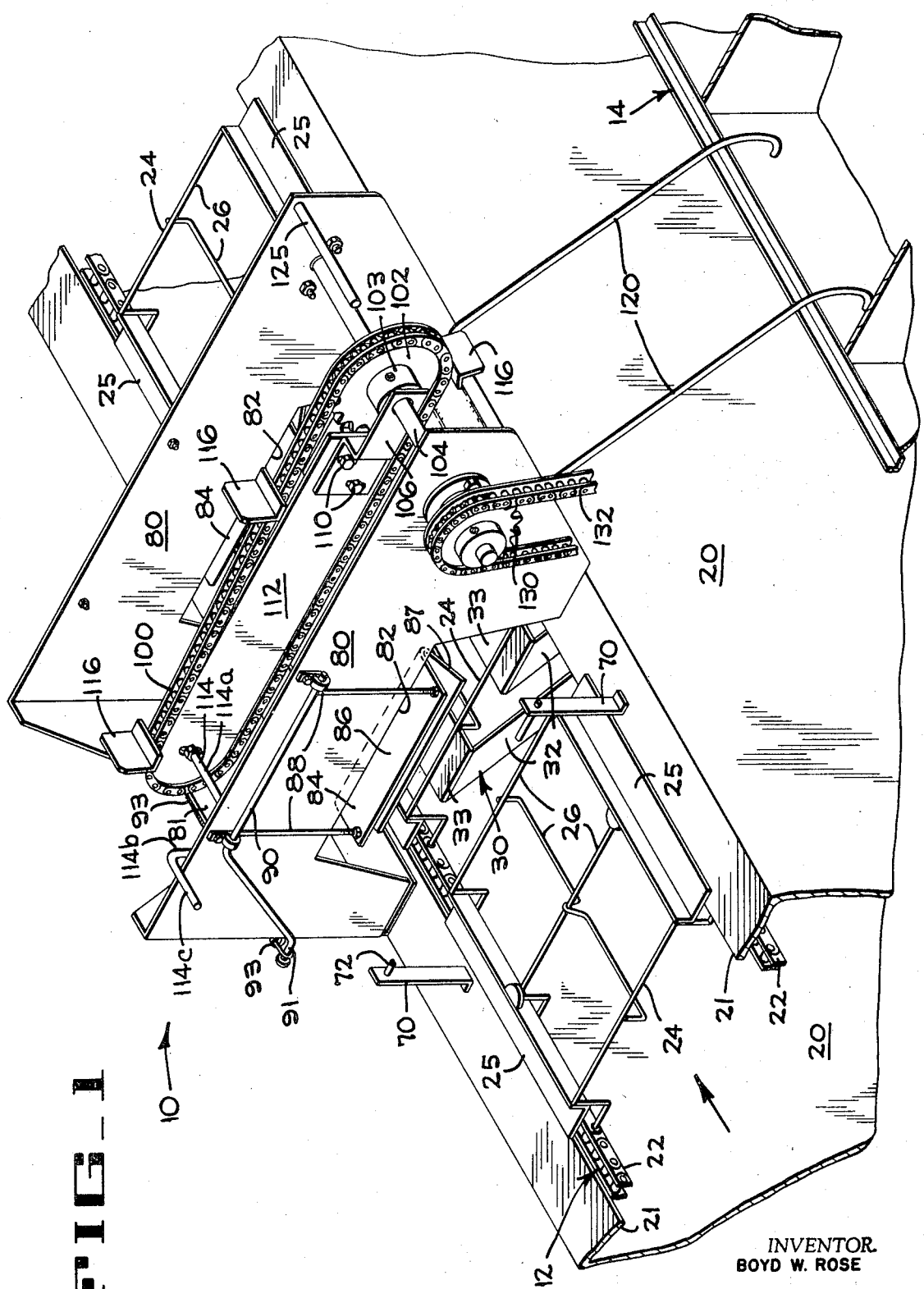

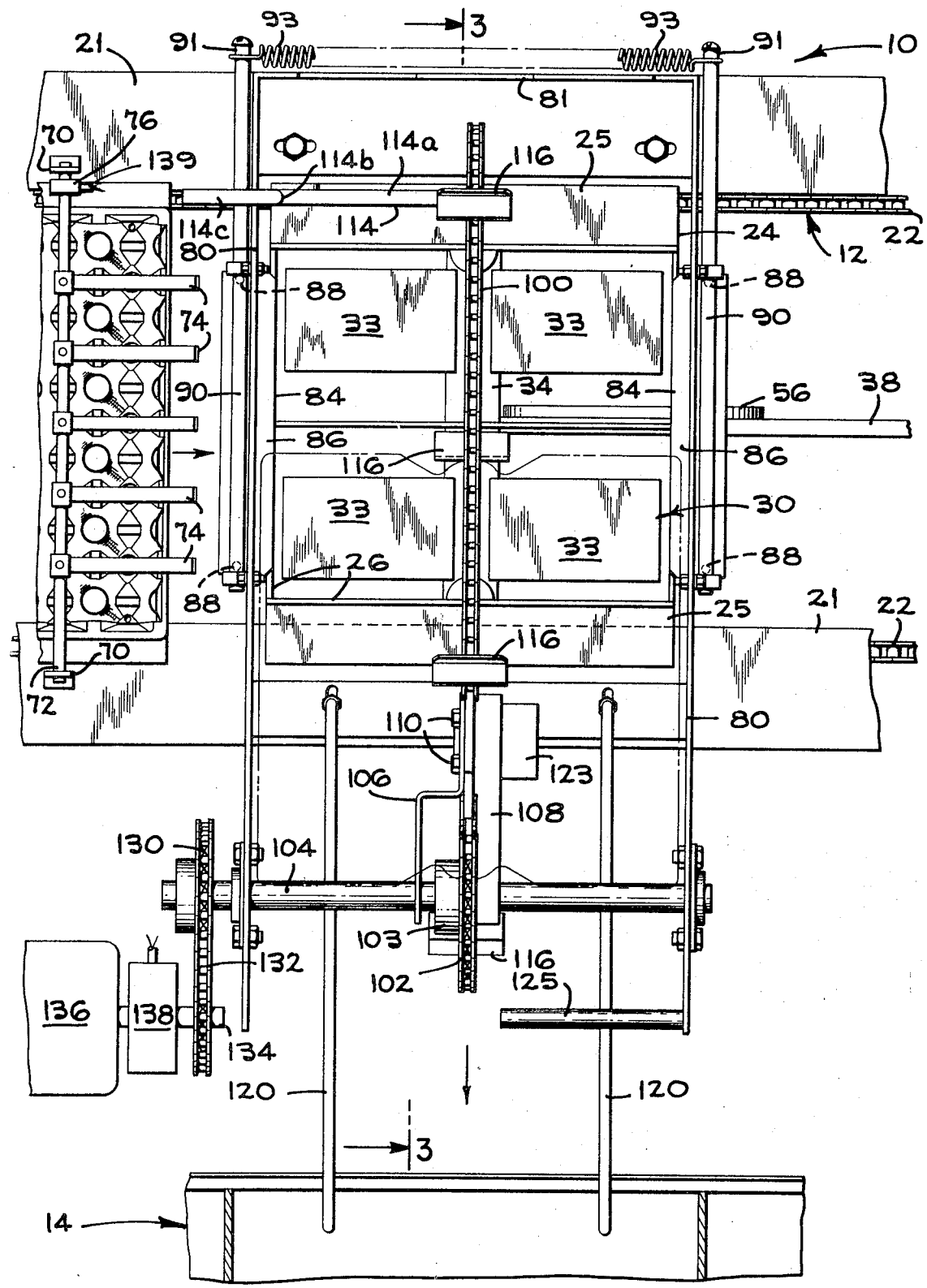
FIG_2

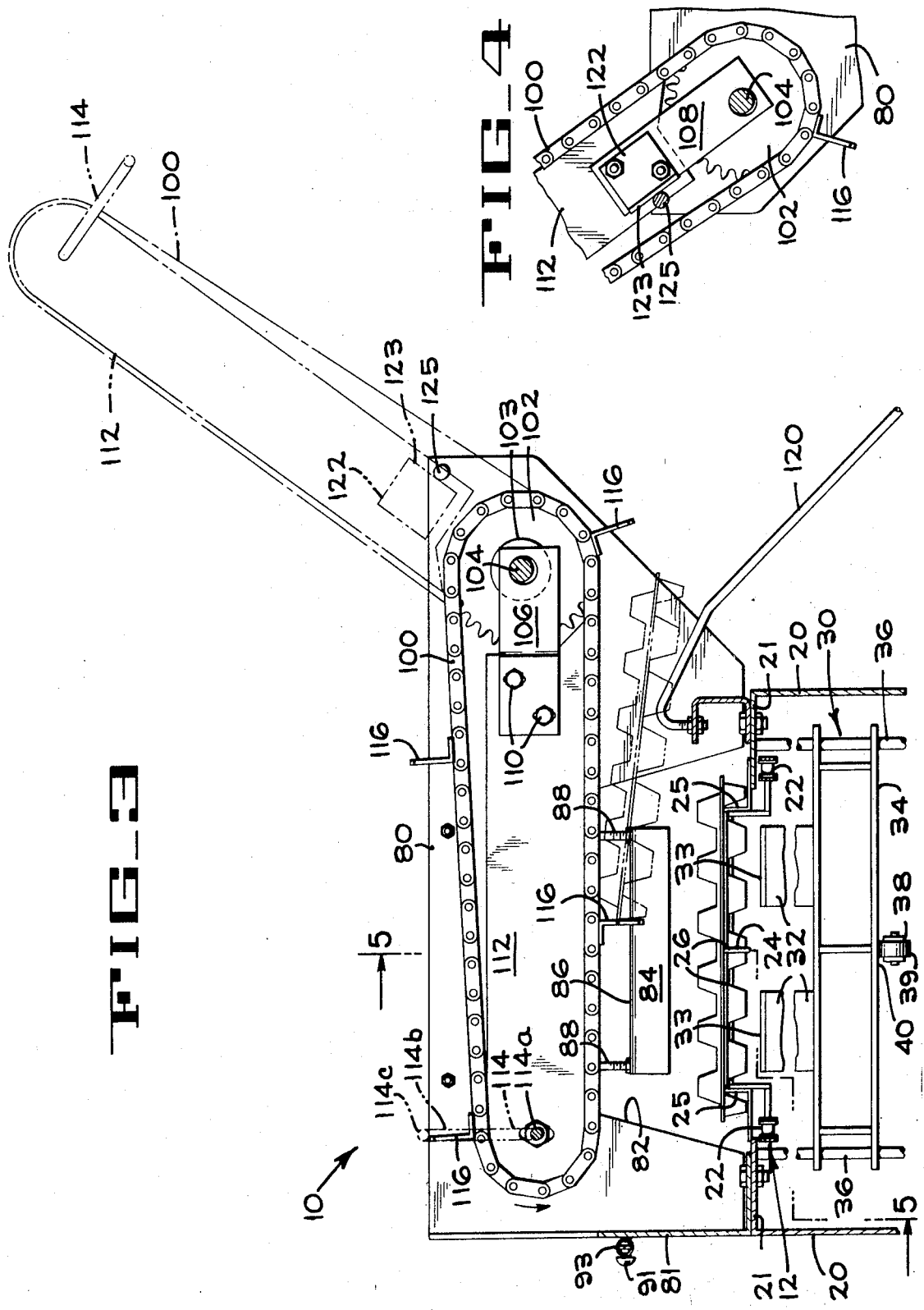

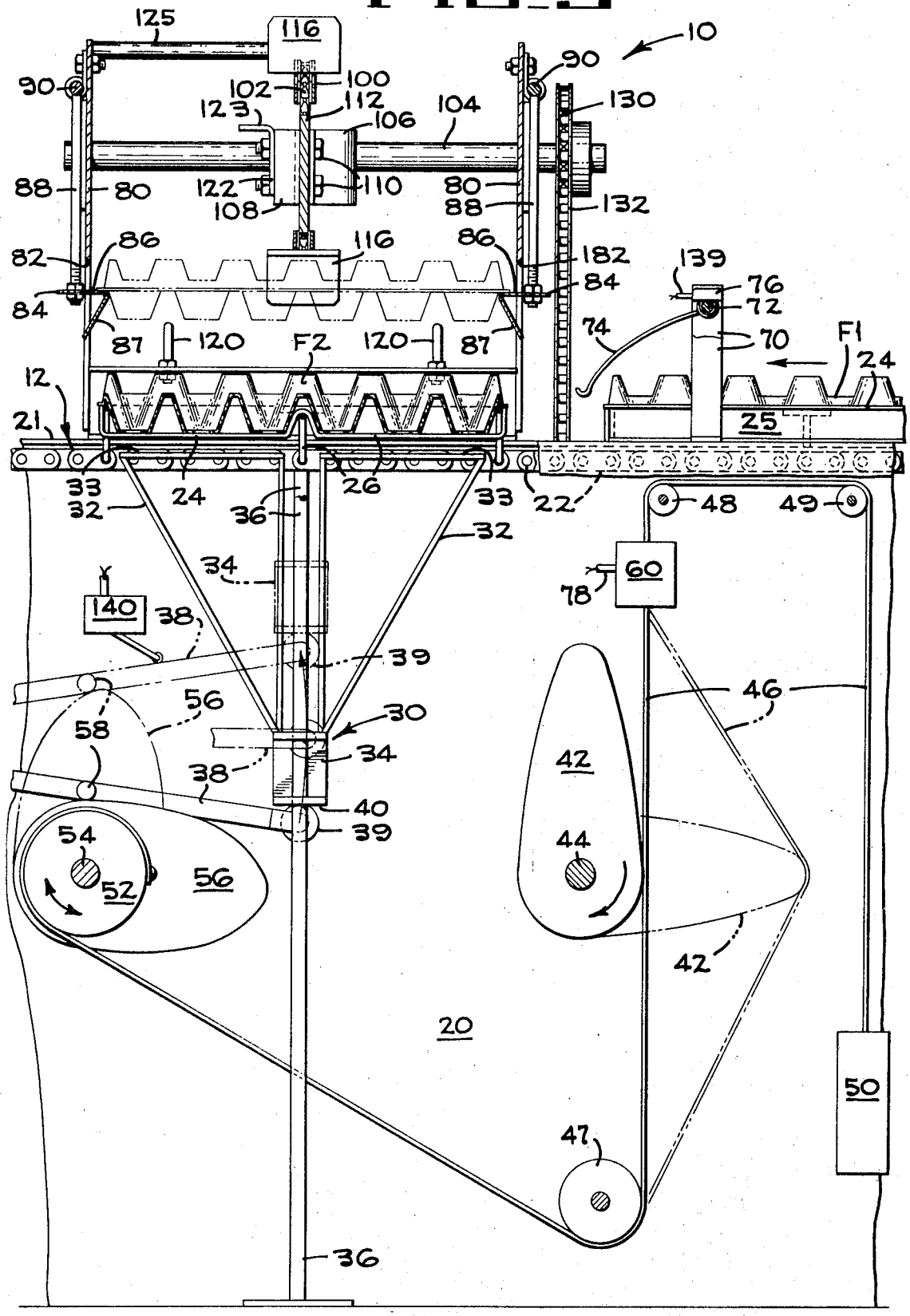

COMBINATION STACKER-FEEDER

BACKGROUND OF THE INVENTION

1. Field of the Invention

The present invention pertains to apparatus for alternatively stacking or feeding flat articles, and more particularly, it pertains to a device for stacking and feeding nestable articles such as egg filler flats.

2. Description of the Prior Art

In industrial material handlings systems it is oftentimes necessary to provide a stacking means for singulated flat articles which are being individually moved along a conveyor. For example, egg filler flats, which are utilized to deliver eggs from the farm to the packing plant, are normally stacked in nested relationship after the eggs have been removed therefrom. Conventional devices for performing this stacking operation include a relatively simple apparatus comprising a vertically movable lifting means which cooperates with an intermittently driven filler flat conveyor to successively lift each flat from its supported position upon the conveyor upwardly past a pair of yieldably mounted supports which receive the flat and place it in nested relationship at the bottom of a stack of flats. When a sufficient number of flats have been thus accumulated upon the supports, the completed stack can be easily removed while the stacking operation continues.

In the handling of egg filler flats it has been found desirable to wash each flat individually when the flats are in a generally dirty condition. In order to perform this operation, which may be required at varying times, it may be necessary to feed the flats in a singulated fashion into a flat washer. Typically, filler flats are fed in a singulated fashion by an endless conveyor which has spaced pusher lugs or the like thereon with the flats being delivered between the lugs of the feed conveyor by a number of conventional delivery devices usually consisting of some means whereby the flat is dropped vertically into the proper position between the lugs.

While stacking devices for flat articles and feeding devices for flat articles are individually old and well known in the material handling art, a structurally simple and readily adaptable device which will perform both of these functions is not generally available. The devices for stacking and for feeding flat articles have conventionally been entirely separated so that different conveying and delivery paths must be utilized for each device. This has necessitated the provision of additional structure in flat handling mechanisms calling for both operations which has increased the cost of such mechanisms and provided additional servicing and maintenance problems.

SUMMARY OF THE INVENTION

With the present invention a device is provided which is readily adaptable to either stack nested articles, such as egg filler flats, or to feed such articles laterally of their initial conveying path. The stacker structure, which is more or less conventional, includes a lifting means for successively lifting each article from its initial conveying path upwardly past a pair of yieldable support members mounted in opposed relationship. An endless feed conveyor is arranged with one of its runs in the plane of the support members and with one or more pusher members being provided upon the conveyor. The movement of the conveyor is timed with the movement of the lifting means so that a pusher member will engage the lifted article and slide it off of the support members in a direction laterally of the initial conveying path. A drive shaft mounting one end of the feed conveyor serves to drive the conveyor in timed relationship with the lifting means, and movable support means are provided for the other end of the conveyor so that the entire endless conveyor structure may be rotated about the axis of the drive shaft and out of the stacking area when it is desired to stack the articles upon said support members rather than feed them laterally.

A particular feature of the present invention is the means for movably supporting the undriven end of the feed conveyor. This mounting means facilitates the rapid conversion of the apparatus since the movable support can be lifted to quickly rotate the conveyor into its nonfunctioning position without requiring any adjustment or material alteration of the apparatus. The conversion of the apparatus can even be made while filler flats continue to be fed thereto so that there is no need for a shutdown of the processing operation and consequent reduction in the output.

Another special feature of the present invention is the fact that the feed conveyor is arranged for cooperation with the conventional stacker structure in a manner such that no special guiding means or feeding means are necessary in order to transfer the flats to the feed conveyor. Thus, the flat feed conveyor can be made with a minimum number of parts to reduce the overall machine cost.

BRIEF DESCRIPTION OF THE DRAWINGS

FIG. 1 is a perspective view showing the combination stacker-feeder apparatus of the present invention.

FIG. 2 is a plan of the combination stacker-feeder apparatus shown in FIG. 1.

FIG. 3 is a longitudinal section taken along the line 3—3 of FIG. 2 particularly illustrating the feed conveyor during operation and showing, in phantom lines, the alternative position of the feed conveyor wherein the apparatus of the present invention is adapted for stacking.

FIG. 4 is a partial side elevation of the feed conveyor of FIG. 3 but showing the conveyor in its alternative position wherein it has been moved out of the stacking area.

FIG. 5 is an enlarged transverse section taken along the line 5—5 of FIG. 3 particularly illustrating the drive for the article lifting means.

DESCRIPTION OF THE PREFERRED EMBODIMENT

As shown in FIG. 1, the combination stacker-feeder apparatus 10 of the present invention is arranged to be utilized with an egg filler flat conveying structure 12 which is adapted to intermittently feed singulated filler flats to the stacker-feeder apparatus so that each flat can be alternatively stacked or fed laterally of the conveying structure to a flat washing machine 14.

The flat conveying structure 12, which is entirely conventional, comprises a pair of side frame members 20 having inwardly projecting flanges 21 at their upper ends forming a support surface. A pair of endless conveyor chains 22 are mounted beneath the flanges and are adapted to be driven (by conventional means not shown) in incremental movements so as to successively bring a series of filler flat carriers 24 to the stacker-feeder apparatus 10. The carriers each comprise a pair of angle members 25 arranged to slide over the support flanges 21 of the conveyor frame structure and a plurality of interconnected rods 26 which secure the corners of the carriers to the conveyor chains and which are attached to the side angle members 25 so as to provide a horizontal support for the grooved underside of the filler flats (FIG. 5). The conveyor chains 22 are arranged to be intermittently driven, in the direction of the arrow shown in FIG. 1, in increments slightly greater than the length of each of the flat supporting carriers 24. As shown in FIG. 5, this incremental distance is equal to the distance between the filler flat F1 at the stationary position immediately prior to the stacker-feeder apparatus 10 and the filler flat F2 which is received in a position to be lifted.

When a filler flat has been brought to the position of the flat F2 in FIG. 5, it is arranged to be lifted upwardly by a lifting mechanism 30 while the conveyor chains 22 are stopped. The lifting mechanism generally comprises a head portion consisting of four uniformly spaced frame members 32 which are arranged to move upwardly between the spaces defined by the support rods 26 of the carriers 24 (FIG. 2) to engage the underside of the filler flat with their flat upper support surfaces 33. The flat supporting frame members 32 are interconnected at their bottom edges by an elongate frame member 34 which is slidably mounted at each of its ends (FIG. 3) upon a pair of fixed guide rods 36 extending vertically within the side frame members 20 of the conveying structure. The lifting mechanism is intermittently elevated so as to lift each filler flat into the phantom line position shown in FIG. 5 by means of a pivot arm 38 which is provided with a roller 39 at its free end adapted to ride upon the lower surface 40 of the frame member 34. Operation of the pivot arm 38 is provided through a drive train actuated by an elongate drive cam 42 which is adapted to be rotated through a drive shaft 44 mounted between the side frame members 20 of the conveying structure. The drive shaft is connected for continuous rotation by conventional motor driving means (not shown). A cable 46 is mounted by means of idler rollers 47, 48 and 49 so that it is in engagement with the face of the continuously rotating drive cam. One end of the cable is attached to a weight 50 while the other end thereof is attached to the periphery of a drum 52 that is fixedly secured to a shaft 54 rotatably mounted between the side frame members 20. Also affixed to the shaft 54 is an elongate cam 56 which is positioned centrally of the side frame members for engagement with a cam follower 58 attached to the midportion of the pivot arm 38. The drive means for the lifting mechanism is shown in full lines in FIG. 5 in its unactuated position wherein the cable is not extended by the drive cam 42 so that the pivot arm 38 and the supported lifting mechanism 30 are in their lowermost position. This condition of the apparatus will prevail for slightly more than one-half of a normal operating cycle during which time the conveyor chains 22 are arranged to be driven to bring a filler flat from the position of the flat F1 to the position of the flat F2. Continued rotation of the drive cam will then act against the cable causing it to rotate the drum 52 and thereby rotate the cam 56 to elevate the lifting mechanism as shown in phantom lines in FIG. 5. A conventional magnetic coil brake 60 is mounted about the cable on the opposite side of the drive cam 42 from that of the drum 52. This coil brake is normally set to securely grip the cable and prevent its movement therethrough so that the pressure of the drive cam against the cable must result in rotation of the drum 52 and its support shaft 54.

Means are provided whereby the lifting mechanism 30 will automatically be rendered inoperative if there is an egg (or other object) left in one of the pockets of the filler flat which is moved into position to be lifted. The structure for accomplishing this function, which is best shown in FIGS. 2 and 5, includes a pair of upright mounting posts 70 arranged upon the support flanges 21 of the conveyor frame structure which posts are arranged to rotatably support a rod 72 that extends laterally across the conveyor structure at an elevated position. Attached to the rod 72 are a plurality of spring arms 74 which project forwardly in the direction of movement of the conveyor chains 22 with the lowermost end of each arm being received directly to the front of a filler flat when it is in the stopped position prior to its incremental movement into the stacker-feeder apparatus 10. As shown in FIG. 2, there is one switch arm 74 provided for each row of egg carrying compartments in the filler flat, and it will be recognized that the presence of an egg in any pocket as the filler flat is moved into the stacker-feeder apparatus will cause the associated arm 74 to pivot upwardly to thereby pivot the rod 72. A mercury switch 76 attached to the rotating rod is connected to the magnetic coil brake 60 through lines 78 so that energization of the brake through the closing of the switch results in the release of the brake from the cable 46. A conventional holding relay and time delay contact (not shown) may be utilized to maintain the brake off for the period of time when the lifting mechanism would normally be in operation. With the brake off, the action of the drive cam 42 against the cable 46 causes the weight 50 to rise since the force required to lift the weight is less than that which would be required to rotate the drum 52. Thus, the lifting mechanism is effectively deactivated if there is an egg in one of the pockets of the filler flat that is moved to the lifting position, and such filler flat will pass right on through the stacker-feeder apparatus without being removed from its carrier 24.

The stacker-feeder apparatus 10 generally comprises a boxlike structure including a pair of wall members 80 and an interconnecting wall 81 which is securely bolted to one of the flanges 21 of the conveyor structure 12 with the wall members 80 being positioned in parallel spaced relationship transversely to the conveyor frame members 20. Each of the wall members is provided with a centrally located opening 82 along the lower edge thereof which permits the passage of the carriers 24 and the filler flats supported thereby. A pair of yieldable support ledges 84 are positioned adjacent the inner face of each wall member at a position just below the maximum elevated position of the support surfaces 33 of the lifting mechanism 30 so that they will receive the flats when the lift mechanism is lowered. Each support ledge includes a flat upper surface 86 for slidably supporting the end flanges on the filler flats and an outwardly inclined lower surface 87 which engages the flanges of the filler flats as they are lifted and causes the ledges to be cammed outwardly of the wall members. Each support ledge is mounted by a pair of rods 88 which are securely attached to each end of the support ledge with the upper ends of the rods being tied to a crank 90 that is rotatably attached to the upper central edge of the associated wall member 80. One end 91 of each of the cranks 90 extends outwardly of the wall members adjacent to the interconnecting wall 81 and serves to mount one end of a coil spring 93 which connects the cranks and thereby urges both of the support ledges 84 into their normal position projecting inwardly into the lift path of the filler flats.

A particular feature of the present invention is the means for feeding the filler flats which means is operated so as to feed the flats one-by-one from the support ledges as soon as they are received thereon although it will be appreciated that alternative modes of operation may be devised where the feeding means is operated only periodically so as to feed two or more flats at a time after such flats have been accumulated upon the support ledges. For this purpose of feeding the flats an endless conveyor chain 100 is positioned approximately midway between and in generally parallel relationship to the wall members 80. One end of the conveyor chain is mounted upon a sprocket 102 the hub 103 of which is securely bolted to a drive shaft 104 that extends between and is rotatably supported by each of the wall members 80. Loosely received upon the drive shaft 104 about the sprocket 102 are a drive arm bracket 106 and a drive arm mounting plate 108. These members are adjustably secured together by bolts 110 and clamp therebetween one end of an elongate drive arm 112 the other end of which is arcuately curved so as to form a support track for one end of the endless conveyor chain 100. A support rod 114 has one end adjustably connected to the other end of the drive arm 112. The support arm 114 includes a first portion 114a extending laterally of the endless conveyor to one of the wall members 80, a midportion 114b extending vertically, and a third horizontally extending portion 114c which is adapted to rest directly atop the upper edge of the aforementioned wall member. Mounted at predetermined intervals about the conveyor chain are a plurality of pusher lugs 116.

It will be noted from the side elevation view of FIG. 3 that the lower run of the endless conveyor chain 100 is generally in the plane of the support ledges 84 whereby the pusher lugs 116 can act to slide the flats along and off of the surface 86 of the ledges to deposit them upon a pair of downwardly inclined guide rods 120 which are mounted upon one of the side frame members 20 of the main conveyor structure and which extend laterally of the conveyor structure to direct the filler flat into the flat washing machine 14.

As shown in full lines in FIG. 3, the apparatus 10 of the present invention is normally adapted to feed each filler flat from its supported position upon the support ledge 84 laterally of the main conveyor structure 12 and into a washing machine 14 or other apparatus. However, when it is desired to stack the flats upon the support ledges 84 rather than feed them laterally, the endless conveyor chain 100 may be lifted by the support arm 114 and pivoted upwardly through an approximate 120° arc so that it is entirely out of the path of the flats. As the lifting mechanism 30 continues to operate, the filler flats will be formed into a stack upon the support ledges with each flat being nested into the bottom of the stack. As shown in FIG. 4, the drive arm mounting bolts 110 also serve to secure an abutment plate 122 to the side of the drive arm mounting plate 108 which abutment plate is provided with a flange 123 extending laterally of the conveyor chain for engagement with a stop rod 125 extending inwardly from one of the adjacent wall members 80. The stop rod thereby serves to maintain the feed conveyor structure in its inactive position and permits the normal stacking operation to be performed. It will be noted that the conversion of the apparatus from feeding (to the washing machine) to stacking can be made by a single pivotal movement of the conveyor chain 100 which movement can be performed quickly even while the filler flat conveyor 12 continues to operate.

The drive for the endless conveyor chain 100 is provided by a sprocket 130 which is attached to an outer end of the drive shaft 104 and which is driven by an endless chain 132 the other end of which is attached to a drive shaft 134 adapted to be powered by conventional means such as a motor 136. A single revolution clutch and brake mechanism 138 of conventional design is provided between the motor and the drive chain 132 so that the drive chain, and ultimately the endless conveyor 100, will be driven in incremental movements when the clutch is energized. In order to provide for the energization of the single revolution clutch, a limit switch 140 is mounted within the conveyor frame structure in a position to be contacted by the pivot arm 38 (FIG. 5) when the lifting mechanism 30 reaches its uppermost position. Energization of the switch actuates the single revolution clutch and brake mechanism 138 through lead 139 so that driving power is provided to the endless conveyor chain 100. By suitable selection of the various sprockets and chains, the endless conveyor chain 100 is adapted to be driven in incremental movements corresponding to the spacing between each of the pusher lugs 116. Thus, actuation of the conveyor chain 100 during each operating cycle will bring a pusher lug from a position outwardly of the support ledges to a position adjacent the guide arms 120 to thereby eject a filler flat from the stacker-feeder apparatus.

From the foregoing description it can be seen that a basically simple yet multifunctional device is provided whereby both stacking operations and feeding operations for flat articles, such as filler flats, can be accomplished with relative ease. To modify the apparatus for either stacking or feeding, only a simple pivotal movement of the feed conveyor is required, such an operation being capable of being performed even while the machine is running and by even an unskilled operator. Thus, the apparatus of the present invention is operable under a variety of operating conditions in accordance with generally existing conditions in the material handling field.

Although the best mode contemplated for carrying out the present invention has been herein shown and described, it will be apparent that modification and variation may be made without departing from what is regarded to be the subject matter of the invention.

What is claimed is:

1. A combination stacker and feeder for flat articles comprising a pair of upright wall members mounted in opposed relationship, means for intermittently conveying said articles beneath one of said wall members to a position between said wall members, means for successively lifting said articles from said conveying means between said wall members, a support member yieldably mounted on each wall member for receiving each of said articles from said lifting means and supporting it above said conveying means, an endless feed conveyor arranged between said wall members in generally parallel relationship therewith and with one run thereof being located generally in the plane of said support members, a pusher member mounted on said feed conveyor for engagement with an article on said support members, a drive shaft mounting one end of said feed conveyor between said wall members, means for operating said drive shaft in timed relationship with said lifting means to slidably feed the article on said support members in a direction laterally of said conveying means, and a movable support mounting the other end of said feed conveyor whereby said feed conveyor may be pivoted about the axis of said drive shaft by an angle greater than 90° so that a stack of said articles may be formed upon said support members by said lifting means.

2. A combination stacker and feeder according to claim 1 wherein said movable support member for said feed conveyor comprises means for rotatably supporting said other end of said feed conveyor and a rod for mounting said last-named means with the distal end of said rod being removably mounted upon one of said wall members.

3. A combination stacker and feeder according to claim 1 wherein said feed conveyor comprises an endless chain, a sprocket for supporting one end of said chain, said sprocket being fixed to said drive shaft, said movable support member for said feed conveyor comprising a member supporting the other end of said chain for rotation thereabout, and a rod for mounting said chain supporting member.

4. A combination stacker and feeder according to claim 3 wherein said rod extends laterally of said feed conveyor and is provided with an end portion adapted to be received upon the top of one of said wall members.

5. A combination stacker and feeder according to claim 2 including an elongate mounting arm, means for mounting one end of said arm on said drive shaft, and the other end of said arm including an arcuate portion arranged to slidably receive said other end of said feed conveyor.

6. A combination stacker and feeder according to claim 1 including a stop mounted upon one of said wall members and extending toward said feed conveyor, and abutment means secured to said feed conveyor for engagement with said stop to maintain said feed conveyor in its pivoted position out of the path of the articles on said support members.

7. A combination stacker and feeder according to claim 2 wherein the lower run of said feed conveyor is located generally in the plane of said support members, said feed conveyor being adapted to be pivoted upwardly into a pivoted position wherein said feed conveyor extends outwardly of said wall members in the direction of feed of the articles by said feed conveyor.

8. A combination stacker and feeder according to claim 7 including a stop mounted upon the upper portion of one of said wall members near one end thereof, said stop extending toward said feed conveyor, and abutment means secured to said feed conveyor for engagement with said stop to maintain said feed conveyor in said pivoted position.

9. A combination stacker and feeder according to claim 3 including switch means arranged for contact by said lifting means when an article is delivered to said support members, said means for operating said drive shaft including an intermittent drive connected for energization by said switch means to move said chain a predetermined distance.

10. A combination stacker and feeder according to claim 9 wherein said chain is provided with a plurality of pusher members, said pusher members being uniformly spaced about said chain by distances corresponding to said predetermined distance.

11. A combination stacker and feeder for flat articles comprising a pair of upright wall members mounted in opposed relationship, means for successively lifting said articles between said wall members, a support member yieldably mounted on each wall member for receiving each of said articles from said lifting means and supporting it, an endless feed conveyor arranged approximately midway between said wall members in generally parallel relationship therewith and with one run thereof being located generally in the plane of said support members, a pusher member mounted on said feed conveyor for engagement with an article on said support members, a drive shaft mounting one end of said feed conveyor between said wall members, means for operating said drive shaft in timed relationship with said lifting means to slidably feed the article from said support members, and a movable support mounting the other end of said feed conveyor whereby said feed conveyor may be pivoted about the axis of said drive shaft by an angle greater than 90° so that a stack of said articles may be formed upon said support members by said lifting means.

12. A combination stacker and feeder according to claim 11 including an elongate mounting arm having one end thereof rotatably received about said drive shaft, said movable support mounting the other end of said feed conveyor including a rod fixed to the other end of said arm and projecting laterally thereof with the projecting end of said rod being arranged to be removably received by one of said wall members.

13. A combination stacker and feeder according to claim 11 wherein the lower run of said feed conveyor is located generally in the plane of said support members, said feed conveyor being adapted to be pivoted upwardly into a pivoted position wherein said feed conveyor extends outwardly of said wall members in the direction of feed of the articles by said feed conveyor.

\* \* \* \* \*